United States Patent [19]

Sprenger et al.

[11] Patent Number: 4,588,500

[45] Date of Patent: May 13, 1986

[54] FUEL FILTER AND DEHYDRATOR

[75] Inventors: Gregory S. Sprenger, LaGrange, Ga.; Noel E. Knight, West Wickham, United Kingdom

[73] Assignee: Kaydon Corporation, Muskegon, Mich.

[21] Appl. No.: 646,523

[22] Filed: Sep. 4, 1984

[51] Int. Cl.[4] .............................................. B01D 27/10
[52] U.S. Cl. ................................. 210/100; 210/489; 210/323.2; 210/DIG. 5
[58] Field of Search ............... 210/489, 100, 323.2, 210/DIG. 5

[56] References Cited

U.S. PATENT DOCUMENTS

| | | | |
|---|---|---|---|
| 2,739,713 | 3/1956 | Robinson | 210/338 |
| 2,960,234 | 11/1960 | Fredrickson | 210/DIG. 5 |
| 3,061,107 | 10/1962 | Taylor | 210/DIG. 5 |
| 3,117,925 | 1/1964 | Kasten | 210/96 |
| 3,142,612 | 7/1964 | Reiman | 210/DIG. 5 |
| 3,151,071 | 9/1964 | Kasten | 210/232 |
| 3,209,916 | 10/1965 | May et al. | 210/489 |
| 3,252,270 | 5/1966 | Pall et al. | 55/74 |
| 3,262,578 | 7/1966 | Dennis | 210/489 |
| 3,339,735 | 9/1967 | Kasten | 210/100 |
| 3,357,560 | 12/1967 | Raupp | 210/96 |
| 3,367,503 | 2/1968 | Topol | 210/96 |
| 3,406,827 | 10/1968 | Topol et al. | 210/96 |
| 3,528,546 | 9/1970 | McPherson | 210/96 |
| 3,528,547 | 9/1970 | Adams et al. | 210/96 |
| 3,572,510 | 3/1971 | Lyda | 210/502 |
| 3,589,364 | 6/1971 | Dean et al. | 128/284 |
| 3,931,019 | 1/1976 | Fowler | 210/489 |
| 4,058,463 | 11/1977 | Bartik | 210/489 |
| 4,102,785 | 7/1978 | Head et al. | 210/DIG. 5 |
| 4,124,116 | 11/1978 | McCabe, Jr. | 206/204 |
| 4,145,285 | 3/1979 | Martin et al. | 210/100 |
| 4,242,206 | 12/1980 | Estabrooke | 210/489 |
| 4,485,011 | 11/1984 | Cole et al. | 210/100 |

FOREIGN PATENT DOCUMENTS

| | | | |
|---|---|---|---|
| 1081428 | 8/1967 | United Kingdom | 210/489 |
| 2077612 | 12/1981 | United Kingdom | 210/DIG. 5 |

*Primary Examiner*—Tim Miles
*Attorney, Agent, or Firm*—Price, Heneveld, Huizenga & Cooper

[57] ABSTRACT

The present invention is directed to a fuel filter dehydrator apparatus for a fuel system which coalesces and retains residual water within the fuel filter. The device comprises a plurality of fuel filter dehydrator elements and a container for housing the filter elements. The container defines a fuel inlet and a fuel outlet for directing fuel through the filter dehydrator elements. Each of the filter dehydrator elements comprises a rigid, porous tube having a water retaining cellulose fiber sheet and water coalescing fiberglass layer wrapped therearound. The fiberglass coalesces water droplets in the fuel passing through the element and then releases the coalesced water to the cellulose fiber sheet. As the cellulose sheet becomes water saturated, its fluid permeability sharply decreases, automatically shutting off fuel flow therethrough. Residence of water in the fiberglass layer substantially adds to the water retaining capacity of each fuel filter dehydrator element. Additional layers of water retaining cellulose and water coalescing fiberglass are provided so that with rising pressure drop on the outer sheet of cellulose, an increase of the compressive loading on underlying layers of fiberglass and cellulose is provided. The compression of subsequent layers of fiberglass provides for the rapid release of water to the underlying layers of cellulose, thus amplifying the fuel shut off feature.

29 Claims, 4 Drawing Figures

FUEL FILTER AND DEHYDRATOR

BACKGROUND OF THE INVENTION

This invention relates generally to fuel filter dehydrator apparatus and more particularly, is directed to a fuel filter dehydrator for use with a ground supply fuel system which automatically shuts off fuel flow upon saturation of the filter dehydrator with water.

The use of water separators or dehydrators for the removal of water from fuel systems is old in the art. Prior art separators and dehydrators are capable of filtering water from the fuel to such a degree that the fuel is acceptable for immediate use. Problems associated with these prior art filtration devices do not ordinarily arise until the device has become saturated with solid particulates, water or ice crystals formed from residual water contained therein. This can result in the discharge of particulates, and/or water into the fuel flow due to the differential pressure in the fuel lines created by the saturation of the filtration device with particulate material and/or water.

In one type of prior art filtration device, the discharge of particulates, water or ice from the filtration device is prevented by placing a sensing device downstream of the filter for mechanically shutting off fuel flow at a predetermined pressure differential across the filtration device.

In another type of filtering device, this valving action is automatically created without further mechanical action by a felt-like mass of water absorptive cellulose which swells to shut off fuel flow as it becomes saturated with water. Exemplary of this type of prior art filtration device is the filter dehydrator disclosed in U.S. Pat. No. 4,242,206 to Estabrooke. In this particular device, a layer of felt-like water absorptive cellulose is provided with a layer of compressed fiberglass wrapped therearound. The fuel flows through the fiberglass and thereafter through the water absorptive cellulose material for filtration and dehydration. The function of the fiberglass material, as stated by Estabrooke, is to emulsify, disperse and deter the release of water droplets within the fuel. However, the dispersing function of the fiberglass layer is inconsistent with the proper operation of the filter as a dehydrator. This is because the felt-like mass of water absorptive cellulose has an inherent porosity which permits small water droplets to pass therethrough. Thus, the emulsifying and dispersing effect of the fiberglass only creates smaller water droplets which are more likely to defeat the filter by passing through the water absorptive cellulose media.

SUMMARY OF THE INVENTION

The present invention solves these and other problems in the prior art by providing a fuel filter dehydrator apparatus comprising a plurality of fuel filter dehydrator elements and a container for housing the elements. The container defines a fuel inlet manifold and a fuel outlet manifold for directing fuel through the filter dehydrator elements. Each of the filter dehydrator elements is provided with a rigid, porous tube, a first water retaining cellulose fiber sheet disposed about the tube and a first water coalescing fiberglass layer disposed about the cellulose sheet. A porous tubular jacket is mounted on the exterior of the tube to protect the underlying fiberglass and cellulose. The cellulose sheet comprises a membrane-like layer of water absorptive cross-linked carboxymethyl cellulose fiber. The cellulose sheet absorbs free water droplets that are applied thereto, the water being taken up by intra-filter absorption. Absorption of water by the cellulose fiber sheet produces rapid swelling of the fiber to form a gel of decreasing permeability. With the support of the fuel element structure, the membrane-like cellulose sheet has sufficient strength to withstand the full pressure of a typical fuel system. The surrounding layer of fiberglass is provided with physical characteristics that result in a coalescing of the water droplets in the fuel passing therethrough. Water droplets coalesced on the fiberglass are passed to the water absorptive cellulose and the droplets are of sizes that are sufficiently large that they do not pass through the cellulose. Full interaction of the water coalescing fiberglass and water retaining cellulose is insured by interleaving several layers of fiberglass and sheets of cellulose. Since the flow of fuel initially passes through layers of fiberglass before reaching the cellulose sheets, the action of the fiberglass is coalescing free water in the fuel into larger droplets provides a residence time for water in the fiberglass which substantially adds to the total water holding capacity of the fuel filter dehydrator element. Further, as a result of interleaving fiberglass layers and cellulose sheets, the fuel flow shut off action of the element is amplified. This is achieved since the outer fiberglass layer and cellulose sheet become saturated with water first and the fluid permeability of the outer sheet of cellulose rapidly decreases. This provides an increased pressure drop across the outer membrane-like sheet of cellulose which compresses subsequent fiberglass layers and cellulose sheets against the rigid interior supporting tube. Compression of subsequent layers of fiberglass releases coalesced water held on the fiberglass layers to subsequent sheets of cellulose amplifying the fuel shut off feature. The physical properties of the fiberglass and other supporting structural layers of the filter dehydrator element are selected to provide dirt filtering and particulate holding capacity.

DESCRIPTION OF THE PREFERRED EMBODIMENTS

Figure 1:
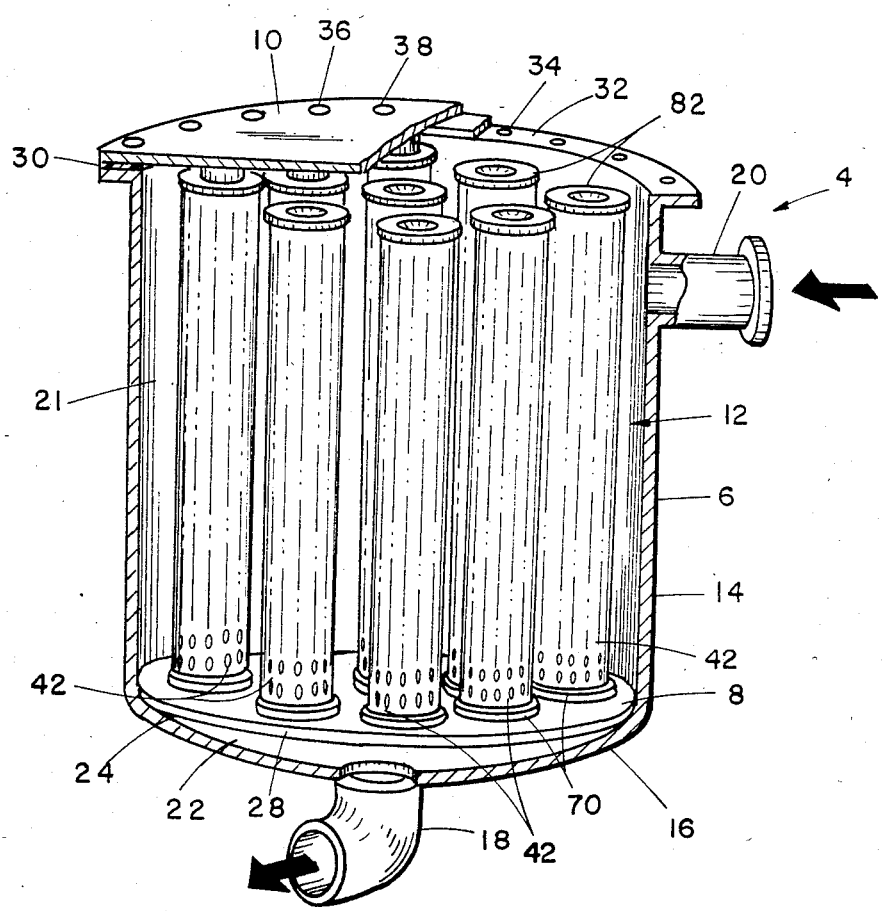
FIG. 1 is a perspective view, partially broken away, of a preferred embodiment of the fuel filter dehydrator apparatus of the present invention.

Referring to the drawings, a fuel filter dehydrator apparatus is provided at 4 comprising a container 6, a fuel element support or deck plate 8, a cover 10 and an assembly of fuel filter dehydrator elements 12 mounted therein on the support plate 8. The container 6 is provided with a continuous sidewall 14, a bottom wall 16, a fuel outlet 18 disposed in the bottom wall 16 and a fuel inlet 20 disposed through the top portion of continuous sidewall 14.

Figure 2:
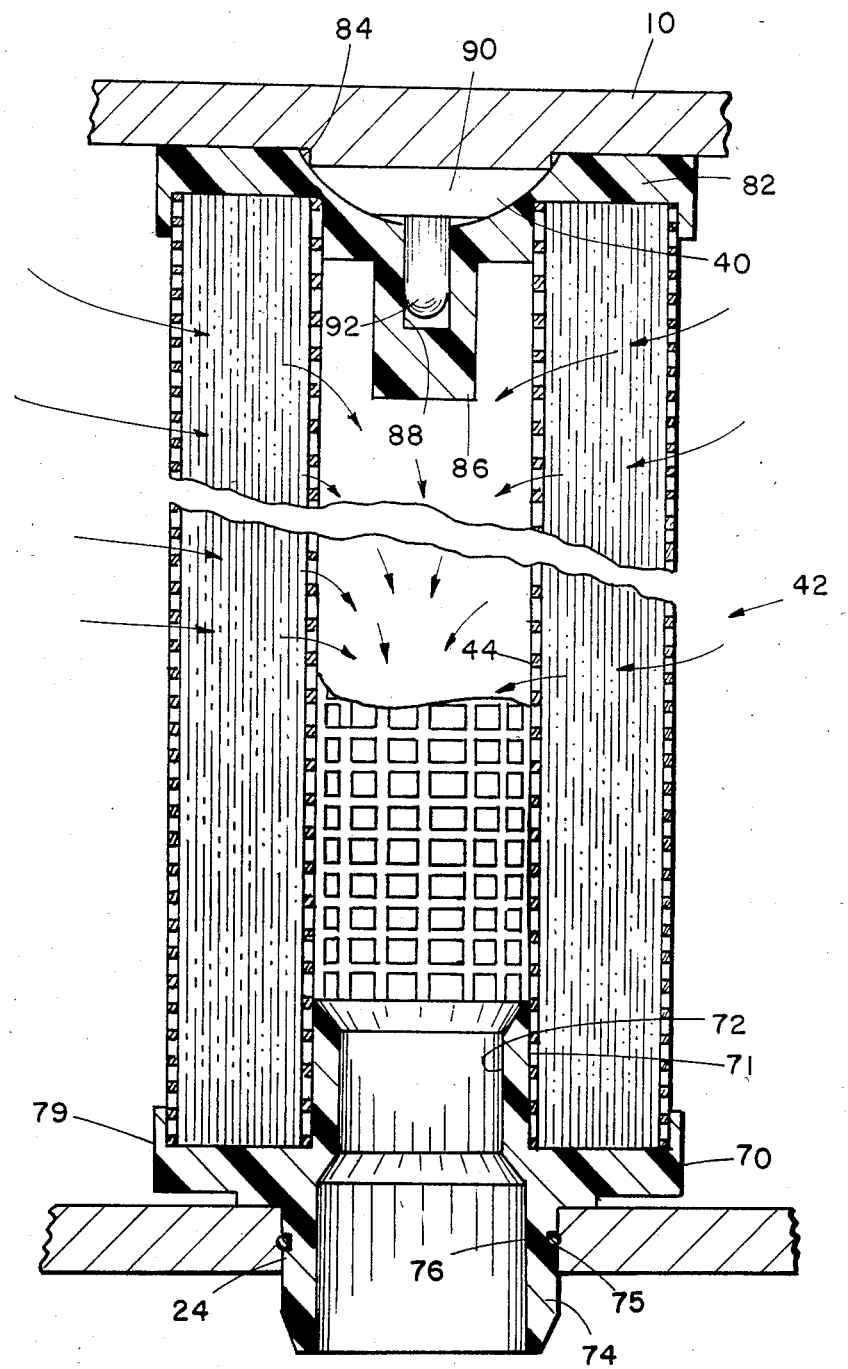
FIG. 2 is an enlarged sectional view of an individual fuel filter dehydrator element of a preferred embodiment of the invention.

The deck plate 8 is disposed generally horizontally within the container 6 and is spaced above the bottom wall 16 so that a fuel inlet chamber or manifold 21 is provided above the deck plate and a clean fuel outlet chamber or manifold 22 is provided below the support plate within the container 6. With reference now also to FIG. 2, a plurality of circular openings 24 are disposed in and extended through the deck plate 8. Each of the filter dehydrator elements of the assembly 12 are tubular in shape and the interior of each element is in fluid communication with a circular opening 24.

The cover 10 is tightly sealed to the top of container 6 by placing a gasket 30 on top of container flange 32 and then clamping the cover 10 thereto. In this regard, the cover 32 and the container are provided with a plurality of apertures 36 disposed along their periphery so that the cover 10 can be secured to the container flange 32 by a plurality of suitable fasteners, not illustrated herein. The cover 10 further includes a plurality of elongated projections 40 extending downwardly therefrom into the container 6. The projections 40 are centrally positioned above each respective opening 24 in support plate 8.

Figure 3:
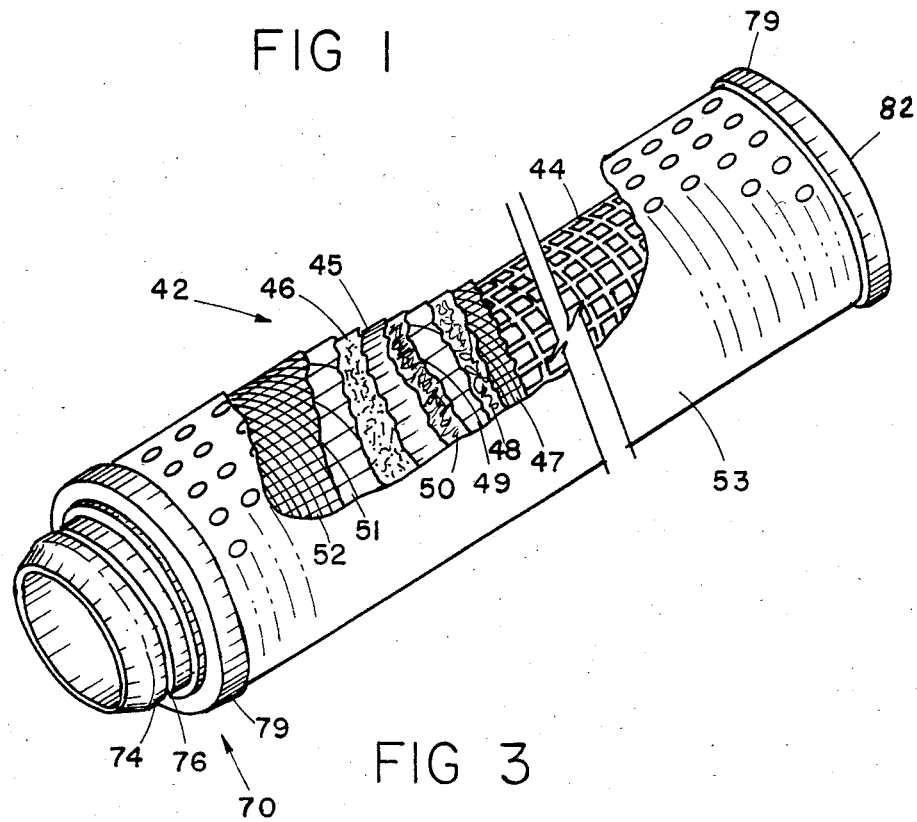
FIG. 3 is an enlarged perspective view, partially broken away, of an individual fuel filter element of a preferred embodiment of the present invention.

With reference now also to FIG. 3, the fuel filter dehydrator element assembly 12 is comprised of a plurality of individual fuel filter elements 42, each one of which includes an innermost rigid porous tube 44. The porous tube 44 primarily acts as a support structure about which the surrounding layers of material are wrapped. The support tube 44 can be formed of a variety of materials and may, for example, comprise a perforated molded or otherwise suitably formed cylindrical structure formed from a polymeric material, a cylindrical wire cage or a cylindrical structure formed from a suitable cellulose material.

The fuel filter dehydrator element illustrated at 42 in FIG. 3 is provided with a first water retaining cellulose fiber sheet 45 and a first water coalescing fiberglass layer 46 disposed therearound. The cellulose fiber sheet 45 is a membrane-like sheet of water absorptive cross-linked carboxymethyl cellulose fiber. This cellulose fiber sheet absorbs free water droplets that are applied thereto, the water being taken up by intrafiber absorption. Absorption of water by the fiber produces rapid swelling of the fiber to form a gel of decreasing permeability. The cellulose fiber sheet 45 is preferably formed from a sheet of cross-linked carboxymethyl cellulose fiber sold by Daicell USA, Inc. 611 West 6th St., Los Angeles, CA 90017, under the trademark "Jelfine R-820". The material is formed in a tough membrane-like sheet having a thickness of approximately 0.007 inches, and has a density of approximately 0.018 pounds per square foot of sheet, or 90 grams per square meter. This material is different from the the felt-like mass of cellulose material used in the prior art in that it is much thinner (0.007 inches vs. 0.05 inches) and tougher. Although this material has the ability to absorb large amounts of water, in many cases twenty times its weight in water, because it is thinner, a layer of this material absorbs less water than the thicker felt-like materials used in the prior art. When properly supported and incorporated in a filter dehydrator element of this type, and saturated with water, the material swells to an extent that the flow resistance of fluid therethrough is substantially increased and in fact overcomes the delivery pressure of the fuel supply system. The flow of fuel through the filter dehydrator element is thus effectively terminated by the creation of a diaphargm-like fluid impermeable sheet. This automatic, self-valving action upon saturation eliminates the need for other saturation sensing and mechanical valving structure.

The next layer which is placed about the cellulose fiber sheet 45 is fiberglass layer 46. The fiberglass layer 46 is designed to coalesce the residual water droplets within the fuel into larger water droplets that are unable to pass through the cellulose fiber sheet 45 despite the inherent porosity thereof. The water droplets which coalesce on the fiberglass layer 46 migrate in the direction of fuel flow to the cellulose fiber layer 45 where they are effectively retained. The fiberglass layer 46 is preferably formed from a material manufactured and sold by Owens-Corning Fiberglass Corporation of Toledo, Ohio, as FM-004 or equivalents thereof. This particular fiberglass of Owens-Corning Fiberglass Corporation has a surface density of approximately 0.010 pounds per square foot, a fiber diameter of approximately 0.00004 inch and is approximately 0.25 inches thick. The fiberglass acts as an agent for coalescing and collecting minute water particles in the fuel. This material characteristic is used to prevent minute water droplets from passing through the cellulose and to significantly supplement the water retaining function of the cellulose. This is in direct contradiction of the prior art teaching in U.S. Pat. No. 4,242,206 that uses materials to act as water emulsifying or dispersing agents.

Materials other than glass fiber that are found to have water coalescing properties may be used, for example, steel wool, stainless steel, aluminum or oxidized aluminum filaments or wires in random, woven or knitted form, aluminum oxides, fibers or filaments, or any combination of these materials.

The filter dehydrator elements 42 are manufactured by either spiral wrapping or single layer wrapping materials about the center support tube 44. With particular reference to the embodiment of the invention illustrated in FIG. 3, the following layers of material are sequentially wrapped about the support tube 44; a first layer 47 of PVC coated fiberglass screen; a first layer of spun bonded nylon 48; a first layer of polyester scrim material 49; and a second layer of spun bonded nylon 50. These layers are then followed by the first sheet of water retaining cellulose fiber 45 and layer of water coalescing fiberglass 46. After the fiberglass layer 46, a second layer of polyester scrim 51 is disposed with a second layer of PVC fiberglass screen 52 disposed thereover. The polyester scrim material is used only as a manufacturing convenience. It is a large weave material having openings approximately 0.25 inches square. The other materials are supported on the polyester scrim as they are wrapped onto the support tube. The fiberglass screen 48 and the spun bonded nylon 48 are wrapped onto the support with first layer of scrim 49. Similarly, the second layer of spun bonded nylon 50, the first sheet of water retaining cellulose 45, and the first layer of water coalescing fiberglass 46 are wrapped on the support tube with the second layer of scrim 51. A suitable material for use as scrim is sold by Phenix Textiles of Phenix City, Ala.

The PVC coated fiberglass screen 47 has a much smaller weave than the scrim material. Materials found suitable for the screen have approximately 18 lines per inch and are manufactured by Phifer Wire Products of Tuscaloosa, Ala. The function of the screen 47 is to support the other layers of material wrapped therearound over the apertures in support tube 44. The apertures in support tube 44 are relatively large (0.25 inches square) to reduce flow resistance. In other embodiments of the invention, for example those using a porous cellulose support tube 44, the screen 47 may be eliminated. The spun bonded nylon layers 48 and 50 provide a media migration barrier. A suitable material for this application is sold by Filtration Systems Products of St. Louis, Mo. The final wrap of PVC fiberglass screen 52 is applied to protect the underlying layer of fiberglass and sheet of cellulose. This construction also provided excellent particulate filtering capability. As an alternative to the spun bonded nylon media migration barrier and the PVC coated glassfiber support layer, a single layer of bonded non-woven polyester fiber sheet may be used. The final wrap is a perforated or porous tubular jacket 53 which extends about the exterior of the filter dehydrator element 42 to improve the cosmetic appearance of the filter element and further protect the underlying layers. The tubular jacket 43 may, for example, comprise a perforated cellulose sleeve.

Figure 4:
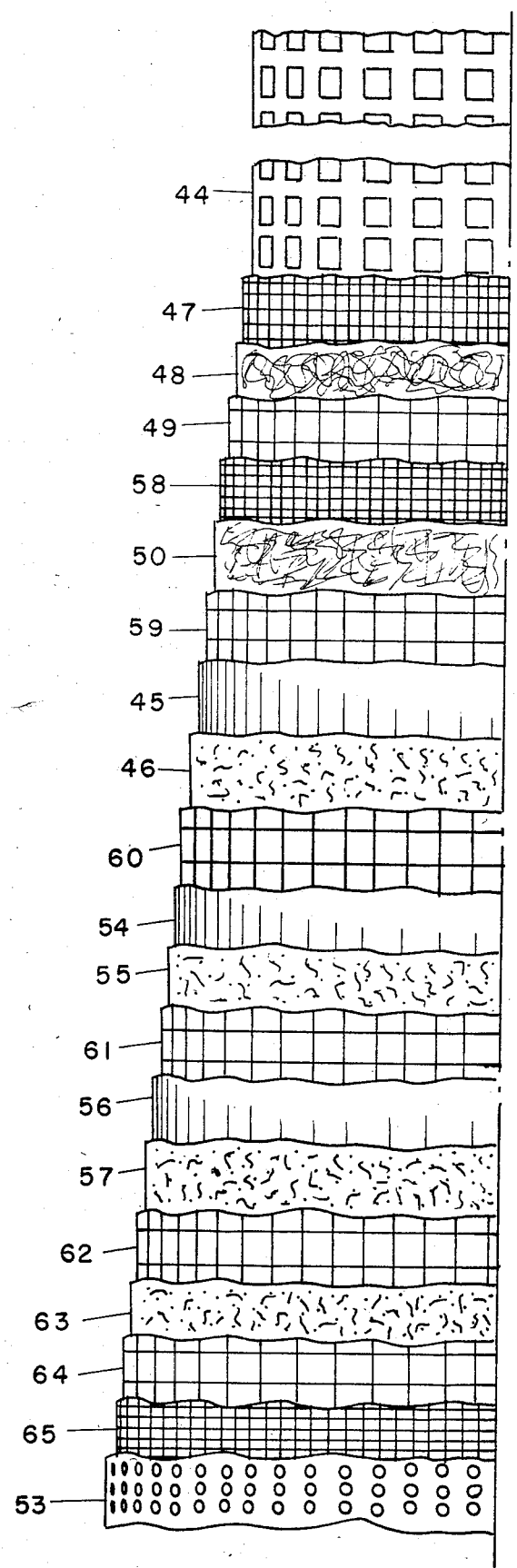
FIG. 4 is an enlarged perspective view, partially broken away, of another individual fuel filter dehydrator element of a preferred embodiment of the present invention.

With reference now to FIG. 4, another preferred embodiment of the invention is illustrated wherein a plurality of water retaining cellulose fiber sheets and water coalescing fiberglass layers are provided. In this case, three interleaved sheets of cellulose and layers of fiberglass are provided. The first sheet of cellulose and layer of fiberglass are illustrated at 45 and 46, respectively. The second sheet of cellulose and layer of fiberglass are illustrated at 54 and 55, respectively; and the third sheet of cellulose and layer of fiberglass are illustrated at 56 and 57, respectively. Provision of multiple interleaved sheets and layers of water retaining cellulose and water coalescing fiberglass insures full interaction between the water retaining cellulose and the water coalescing fiberglass. Further, the provision of multiple layers of fiberglass substantially adds to the total water holding capacity of the filter dehydrator element. This is an important feature since the relatively thin, membrane-like sheets of cellulose do not retain as much water as the relatively thick felt-like mass of cellulose used in prior art filter dehydrator elements. In coalescing free water in the fuel into larger droplets, the fiberglass in effect increases the residence time of the water in the fiberglass which in turn increases the total water holding capacity of the filter dehydrator element. Still further, the provision of multiple interleaved layers of fiberglass and sheets of cellulose results in an amplifying of the automatic fuel shut off function of the filter dehydrator element. This is achieved since the outer layer of fiberglass 57 and sheet of cellulose 56 are the first to become saturated with water. As the fluid permeability of the outermost thin, tough, membrane-like sheet of water retaining cellulose 56 decreases, the pressure drop across this sheet of cellulose dramtically increases. This substantially increases the compressive load on subsequent layers of fiberglass, namely layers 55 and 46, against the rigid interior supporting tube 44. This provides for the rapid release of water coalesced thereon to the underlying water retaining cellulose layers 54 and 45. This hastens the saturation of these layers of cellulose with water causing a substantial decrease in the fluid permeability of these layers and thus amplifying the fuel shut off feature.

The structure of the fuel element illustrated in FIG. 4 is similar to that illustrated in FIG. 3. Disposed about the center structural support tube 44 are a first layer of PVC coated fiberglass support screen 47; a first layer of spun bonded nylon media migration barrier 48; and a first layer of polyester scrim 49, which is used as a manufacturing convenience when applying layers 47 and 48. However, interleaved between the polyester scrim material 49 and the second layer of spun bonded nylon 50 is an additional or second layer of PVC coated fiberglass support screen 58 and disposed between the second spun bonded layer 50 and the first layer of cellulose 45 is a second layer of polyester scrim 59, which is used as a manufacturing convenience when applying layers 50 and 58. The first sheet of cellulose 45 and layer of fiberglass 46 are applied with a third layer of polyester scrim 60. Similarly, the second and third sheets of cellulose and layers of fiberglass are applied with fourth and fifth layers of polyester scrim 61 and 62, respectively. After the fifth layer of scrim 62, a final layer of fiberglass is provided at 63. The fiberglass layer 63 is applied with a final layer of scrim 64. A final layer of PVC fiberglass screen 65 is disposed thereover. The outermost layer of fiberglass 63 is provided to initially coalesce water droplets entering the filter dehydrator element and provide an initial particulate filtering layer. The perforated tubular jacket 53 extends over the exterior of the filter dehydrator element in the manner illustrated in FIG. 3. During the wrapping process the layers are held in place by overlapping the ends of the layers of scrim 49, 59, 60, 61, 62 and 64; the fiberglass screen 47, 58 and 65; and the jacket 53 and applying a suitable adhesive to the overlapped ends.

With reference now again to FIG. 1, the individual fuel filter dehydrator elements 42 are positioned within the container or housing 6 in a parallel generally vertical oriented array. With reference now also again to FIG. 2, each of the individual filter dehydrator elements 42 are positioned on the deck plate 8 within the container 6 with a nozzle element 70 that is registered in an aperture 24 in the deck plate 8. Each of the nozzles 70 includes a cylindrical portion 71 which fits within the interior of the bottom portion of the support tube 44 of each filter dehydrator element 42. Each of the nozzle elements 70 includes a central opening 72 extending therethrough. Thus, the interior of the generally tubular filter dehydrator element 42 is in fluid communication with the central passage 72 in nozzle element 70. Each of the nozzles 70 is provided with a cylindrical portion 74 having a diameter slightly smaller than the interior diameter of the aperture 24 in deck plate 8. An annular groove 75 is provided on the cylindrical portion 74 and a sealing O-ring 76 is disposed therein. When the cylindrical portion 74 of the nozzle 70 is inserted in an aperture 24, compression of the O-ring 76 holds and seals the nozzle in place. A flange 79 extends over the exterior of the filter dehydrator element and the nozzle elements are secured to the interior support tube and the layers wrapped thereover with a suitable adhesive such as epoxy acrylic, urethane or equivalents.

The top end of the fuel filter dehydrator element 42 is secured to the cover 10 by inserting a cap element 82 into the top portion of support tube 44. The cap 82 is provided with a flange 79 and is adhesively secured to the interior of the support tube 44 and the layers wrapped therearound in a fashion similar to the nozzle 70. The cap 82 is provided with a dish-like outer portion 84 and a neck portion 86 with a bore 88 extending therein. The neck portion 86 and bore 88 extend within the interior of support tube 44. Each of the projections 40 disposed on the cover 10 comprises a dome 90 with a nipple 92 extending downwardly therefrom. The dome 90 and the nipple 92 are received within the dish outer portion 84 and bore 88 of the cap 82, respectively.

Although no seal is required between the cap 82 and the cover 10, the cap 82 is similarly made of a self-sealing material such as polypropylene.

The individual fuel filter elements 42 just described provide for fuel flow therethrough at an approximate rate of one gallon per minute per one inch of element length. The number of elements and their lengths are naturally dependent upon the desired rate of fuel flow. Generally, most systems will require a rate of approximately 300 to 600 gallons per minute. This may be provided in any number of ways. For example, if a total flow rate of 300 gallons per minute is desired, a preferred embodiment of the present invention would comprise a fuel filter apparatus 4 having fifteen individual fuel filter dehydrator elements 42, each 20 inches long, positioned therein. Since each element provides an approximate fuel flow of one gallon per minute per one inch of element length, this preferred embodiment yields a total flow rate of 300 gallons per minute (15 elements×20 inches×1 gallon/1 minute/1 inch).

In operation, such an embodiment of the fuel filter apparatus of the present invention provides for the filtration and dehydration of fuel by receiving fuel, under pressure, at fuel inlet 20 of container 6. Thereafter, the fuel is directed to the individual fuel filter dehydrator elements 42 wherein the fiberglass layers coalesce residual water in the fuel into larger water droplets which migrate to and are retained by the water retaining cellulose fiber layers contained therein. The cleansed and dehydrated fuel then passes downwardly through the interior of support tubes 44 through nozzles 70 and deck plate openings 24 into outlet chamber 22. Thereafter, the cleansed and dehydrated fuel exits the container 6 at fuel outlet 18. The fuel filter apparatus 4 is designed to automatically shut down the fuel supply system upon saturation of the filter dehydrator elements with water. This is accomplished by the rapid decrease in the fluid permeability of the diaphragm-like cellulose sheets contained within the filter dehydrator elements 42 which provide a pressure drop that normally overcomes the delivery pressure of the fuel entering the filtration apparatus 4. However, the fuel filter apparatus 4 may also be designed to shut down the primary filter dehydrator when a predetermined differential pressure is attained across the filter apparatus. This condition may be used to shut down the fuel delivery system in its entirety or route the fuel to an alternative filter dehydrator. Concurrently therewith, the operator would be informed of the need to replace the filter dehydrator elements in the filtration apparatus.

The above description should be considered exemplary and that of the preferred embodiment only. Modifications of the invention will occur to those skilled in the art. The true scope and spirit of the present invention should be determined with reference to the appended claims. It is desired to include within the present invention all such modifications of the invention that come within the proper scope of the appended claims.

The embodiments of the invention in which an exclusive property or privilege is claimed are defined as follows:

1. A fuel filter dehydrator apparatus comprising:
 a container having a fuel inlet and a fuel outlet;
 a support plate having a plurality of openings therethrough and being positioned within said container and forming therebetween an outlet manifold in communication with said container outlet;
 a cover plate being removably fixed to said container to form a fuel inlet chamber within said container;
 a plurality of hollow filter elements disposed within the inlet chamber and extending between said support plate and said cover plate, and communicating with said outlet manifold through respective ones of said support plate openings, each of said filter elements having a rigid, porous tube having a top end and a bottom end, a plurality of thin, tough, diaphragm-like water retaining cellulose fiber sheets placed about said tube and a plurality of water coalescing fiberglass layers placed about said tube, said water retaining cellulose fiber sheets having a decrease in fluid permeability upon saturation which automatically shuts off fluid flow therethrough; said water retaining cellulose fiber sheets being interleaved with said water coalescing fiberglass layers, one of said fiberglass layers being disposed upstream of one of said cellulose sheets, whereby diaphrarm-like sheets of saturated cellulose have a compressive effect on downstream layers of fiberglass further decreasing the fluid permeability of said downstream sheets of cellulose by releasing water coalesced in said fiberglass thereto and thus amplifying the fuel shut off effect;
 means for securing said fiberglass sheet and said cellulose fiber layer to said tube; and
 means for connecting said ends of said filter elements to said support plate and said cover plate, whereby a fuel to be filtered enters said container inlet, passes through said filtering elements wherein coalescence and water retention occurs, and thereafter flows into said outlet manifold for passage through said container outlet, until at least one of said water retaining cellulose fiber sheets becomes saturated with water, decreasing the fluid permeability of said cellulose fiber and automatically shutting off fuel flow therethrough.

2. The apparatus of claim 1 wherein a plurality of layers of polyester scrim are interleaved between said layers of water retaining cellulose fiber and water coalescing fiberglass as a manufacturing convenience.

3. The apparatus of claim 1 wherein said porous tube is first wrapped with a layer of spun bonded nylon as a media migration barrier.

4. The apparatus of claim 1 wherein said porous tube is first wrapped with a PVC coated fiberglass support screen and then a layer of spun bonded nylon as a media migration barrier.

5. The apparatus of claim 1 wherein said fiberglass layers are a fiberglass having a surface density of approximately 0.010 pounds per square foot and a fiber diameter of approximately 0.00004 inch.

6. The apparatus of claim 1 wherein a porous tubular jacket is provided formed from a perforated cellulose layer.

7. The apparatus of claim 1 wherein said porous tube is formed from a perforated polymeric tube.

8. The apparatus of claim 1 wherein said connecting means comprises:
 a plurality of projections extending downwardly from said cover and being centrally disposed above respective ones of said support plate openings;
 a plurality of cap members being attached to respective top ends of said filter elements, said cap members having neck portions with bores therein, said neck portions extending into respective ones of said tube members for receiving respective ones of said projections therein; and a plurality of nozzles being attached to respective bottom ends of said filter elements, each of said nozzles being received in a respective one of said support plate openings.

9. The apparatus of claim 1 wherein said porous tube is wrapped in sequence with:
a first PVC coated fiberglass support screen;
a first spun bonded nylon layer;
a first polyester scrim;
a second spun bonded nylon layer;
a first water retaining cellulose fiber sheet;
a first water coalescing fiberglass layer;
a second polyester scrim;
a second PVC coated fiberglass screen; and
a porous tubular jacket.

10. The apparatus of claim 9 wherein upstream of said second polyester scrim at least one group of additional layers are provided, said group of additional layers comprising in sequence:
an additional sheet of water retaining cellulose fiber;
an additional layer of said water coalescing fiberglass; and
an additional layer of polyester scrim;
so that when said additional sheet of cellulose becomes saturated with water it has a compressive effect on downstream layers of fiberglass releasing water coalesced in said fiberglass to said cellulose thus amplifying the fuel shut off effect.

11. The apparatus of claim 1 wherein said water retaining cellulose fiber sheets each comprise a sheet of water absorptive and water insoluble cross-linked carboxymethyl cellulose fiber material.

12. The apparatus of claim 11 wherein said sheets of cellulose are approximately 0.007 inches thick with a density of 0.018 pounds per square foot.

13. The apparatus of claim 1 wherein said porous tube is wrapped in sequence with:
a first PVC coated fiberglass screen;
a first spun bonded nylon layer;
a first polyester scrim;
a second PVC coated fiberglass support screen;
a second spun bonded nylon layer;
a second polyester scrim;
a first water retaining cellulose fiber sheet;
a first water coalescing fiberglass layer;
a third polyester scrim;
a second layer of said water coalescing fiberglass;
a fourth polyester scrim;
a third PVC coated fiberglass screen; and
a porous tubular jacket.

14. The apparatus of claim 13 wherein upstream of said third polyester scrim at least one group of additional layers is provided, said group of additional layers comprising in sequence:
an additional sheet of said water retaining cellulose fiber;
an additional layer of said water coalescing fiberglass; and
an additional layer of polyester scrim;
so that when said additional sheet of cellulose becomes saturated with water it has a compressive effect on downstream layers of fiberglass releasing water coalesced in said fiberglass to said cellulose thus amplifying the fuel shut off effect.

15. The apparatus of claim 15 wherein two of said groups of additional layers are provided.

16. The apparatus of claim 14 wherein a plurality of said groups of additional layers are provided.

17. A fuel filter dehydrator element comprising:
a porous tubular support;
a plurality of thin, tough, membrane-like sheets of water retaining cellulose fiber wrapped about said tubular support for retaining water droplets coalesced from the fuel;
a plurality of water coalescing layers wrapped about said cellulose fiber sheets and adapted to coalesce water from the fuel, whereby water in the fuel passing through said water coalescing layers is coalesced therein into water droplets which pass through to said cellulose fiber sheets where said water droplets are retained until said water retaining cellulose fiber sheets become saturated with water, decreasing the fluid permeability of said cellulose fiber and automatically shutting off fuel flow therethrough; and
said water retaining cellulose fiber sheets being interleaved with said water coalescing layers, each of said water coalescing layers being disposed upstream of a respective one of said cellulose sheets, whereby the cellulose sheets when saturated have a compressive effect on downstream water coalescing layers further decreasing the fluid permeability of said downstream sheets of cellulose by releasing water coalesced in said water coalescing layers thereto and thus amplifying the fuel shut off effect.

18. The fuel filter dehydrator element of claim 17 wherein said porous tube is first wrapped with a PVC coated fiberglass support screen and then a layer of spun bonded nylon as a media migration barrier.

19. The fuel filter dehydrator element of claim 17 wherein said porous tube is wrapped in sequence with:
a first PVC coated fiberglass support screen;
a first spun bonded nylon layer;
a first polyester scrim;
a second spun bonded nylon layer;
a first water retaining cellulose fiber sheet;
a first water coalescing fiberglass layer;
a second polyester scrim;
a second PVC coated fiberglass screen; and
a porous tubular jacket.

20. The fuel filter dehydrator element of claim 17 wherein said fiberglass layer is a fiberglass having a surface density of approximately 0.010 pounds per square foot and a fiber diameter of approximately 0.00004 inch.

21. The fuel filter dehydrator element of claim 17 wherein a porous tubular jacket is provided formed from a perforated cellulose layer.

22. The fuel filter dehydrator element of claim 17 wherein said porous tube is formed from a perforated polymeric tube.

23. The fuel filter dehydrator element of claim 17 wherein said water retaining cellulose fiber sheets each comprise a sheet of water absorptive and water insoluble cross-linked carboxymethyl cellulose fiber material.

24. The fuel filter dehydrator element of claim 17 wherein said sheets of cellulose are approximately 0.0007 inches thick with a density of 0.018 pounds per square foot.

25. The fuel filter dehydrator element of claim 17 wherein said porous tube is wrapped in sequence with:
a first PVC coated fiberglass screen;
a first spun bonded nylon layer;
a first polyester scrim;

a second PVC coated fiberglass support screen;
a second spun bonded nylon layer;
a second polyester scrim;
a first water retaining cellulose fiber sheet;
a first water coalescing fiberglass layer;
a third polyester scrim;
a second layer of said water coalescing fiberglass;
a fourth polyester scrim;
a third PVC coated fiberglass screen; and
a porous tubular jacket.

26. The fuel filter dehydrator element of claim 25 wherein upstream of said third polyester scrim at least one group of additional layers are provided, said group of additional layers comprising in sequence:
an additional sheet of said water retaining cellulose fiber;
an additional layer of said water coalescing fiberglass; and
an additional layer of polyester scrim;
so that when said additional sheet of cellulose becomes saturated with water it has a compressive effect on downstream layers of fiberglass releasing water coalesced in said fiberglass to said cellulose thus amplifying the fuel shut off effect.

27. The fuel filter dehydrator element of claim 26 wherein upstream of said second polyester scrim at least one group of additional layers are provided, said group of additional layers comprising in sequence:
an additional sheet of water retaining cellulose fiber;
an additional layer of said water coalescing fiberglass; and
an additional layer of polyester scrim;
so that when said additional sheet of cellulose becomes saturated with water it has a compressive effect on downstream layers of fiberglass releasing water coalesced in said fiberglass to said cellulose thus amplifying the fuel shut off effect.

28. The fuel filter dehydrator element of claim 26 wherein two of said groups of additional layers are provided.

29. The fuel filter dehydrator element of claim 26 wherein a plurality of said groups of additional layers are provided.

* * * * *